United States Patent [19]

Martino, Jr.

[11] 3,747,076

[45] July 17, 1973

[54] MEMORY WRITE CIRCUIT

[75] Inventor: William L. Martino, Jr., Lowell, Mass.

[73] Assignee: Honeywell Information Systems Inc., Waltham, Mass.

[22] Filed: Jan. 3, 1972

[21] Appl. No.: 215,977

[52] U.S. Cl. ...... 340/173 R, 340/173 CA, 307/238, 307/279

[51] Int. Cl. ........................................... G11c 11/40

[58] Field of Search .................. 340/173 CA, 173 R

[56] References Cited

UNITED STATES PATENTS 3,651,334 3/1972 Thompson.................... 340/173 CA

*Primary Examiner*—Terrell W. Fears

*Attorney*—Faith F. Driscoll et al.

[57] ABSTRACT

A MOS write circuit includes circuits which are operative during a first interval of a memory cycle of a storage unit to store a predetermined signal to represent a result. During another interval, the circuits logically combine binary information signals applied thereto by the storage unit and a utilization device. In accordance with the result of logically combining the information signals, the circuit selectively modifies the state of a signal representation of the result stored during the first interval. The write circuit further includes output circuits which are rendered operative conditionally by external command signals from the device to switch state during another interval of the same memory cycle in accordance with the stored result as modified, producing complementary output signals representative of either binary ONE or binary ZERO information.

23 Claims, 3 Drawing Figures

PATENTED JUL 17 1973 3,747,076

SHEET 1 OF 2

MEMORY WRITE CIRCUIT

BACKGROUND OF THE INVENTION

1. Field of Use

This invention relates to metal oxide semiconductor (MOS) storage systems and more particularly to MOS circuits for writing digital information into the cells of a MOS store.

2. Prior Art

In general, prior art circuits used to write data signals into the memory cells of a MOS store, in some instances may be required to alter their operation in response to command signals from a utilization device. Systems which accommodate this type of operation normally provide separate data input and data output buses wherein the circuits associated with each bus can have their operation modified without affecting the operation of the other circuits. An important disadvantage of these prior art systems is the increase in complexity arising from interconnections between cells of the memory system and the data buses.

Another disadvantage of the above mentioned prior art circuits is that such circuits are unable to respond directly to low level input data signals provided by the utilization device. Thus, the utilization device is required to convert such low level signals into high level signals suitable for operating such circuits. These conversion operations have been found to be quite time consuming where the utilization device is required during a read modify write type of operation to modify the data read out from a memory cell. This is true particularly where the data read out from the cell is modified in accordance with the results of a checking operation performed by the device and is thereafter written into the memory cell by the Write circuit.

Accordingly, it is an object to provide a circuit which produces high level signals representative of information to be written into an MOS device in response to low level input data signals.

Accordingly, it is another object of the present invention to provide a circuit arranged to perform a logical operation upon a plurality of binary signals and in accordance with the results to provide output signals representative of information for writing into a memory device.

It is a further object of the present invention to provide a circuit operative within a single memory cycle to alter its operation in response to a command signal.

It is a more specific object to provide a write circuit for use in a MOS memory system which facilitates the performance of a read modify write type of operation by the system.

It is still a more specific object to provide a write circuit constructed of MOS field effect transistors which logically combine low level binary information signals to produce high level output signals suitable for use in a MOS field effect transistor memory system.

SUMMARY OF THE INVENTION

The foregoing objects are achieved in a preferred embodiment of the present invention by a write circuit including an input logic gating circuit section and an output driver circuit section. The logic gating circuits are responsive to a first clocking signal during a first interval of an operative cycle to store a signal representation indicative of a result. During an interval following a read interval of the cycle defined by a second clocking signal, the logic gating circuits perform a logical operation upon input binary signals applied thereto and in accordance with the result change the state of the signal representation stored during the first interval. During a later interval of the same operative cycle defined by a third clocking signal, the output driver circuits switch state in accordance with the stored representation and apply high level output signals representative of either binary ONE or binary ZERO information for writing into a MOS memory storage device of a MOS memory system.

The write circuit includes logic gating circuits arranged to receive command signals from a utilization device and arranged to alter the operation of the circuit in accordance with the state of these signals. More particularly, the gating circuits in response to a change of state of a first control signal occurring before an interval of a cycle defined by the third clocking signal, indicative of the fact that the utilization device has changed a request for a write operation to a read operation, alters the normal operation of the circuit in a manner so as to inhibit the output driver circuits from switching state and applying an output signal representative of binary ONE or binary ZERO information to an input/output or digit/sense bus.

Additionally, the logic gating circuits of write circuit are arranged to sample and store signal representation of data read from the memory during an interval defined by a further clocking signal. The gating circuits logically combine the stored data signal with the input data signal and the complement of the input data signal in a manner for enabling the circuit to modify the result stored in accordance with changes in the state of low level input data signals just prior to the occurrence of the third clocking signal. This arrangement enables the circuit to perform a read modify write operation controlled by low level input signals.

The arrangement of the invention also makes it possible to extend time duration allocated to modifying the input data signals as long as required by simply delaying the time occurrence of the third clocking signal and the input data signals this in turn provides sufficient time during which the circuit modifies the stored result in response to changes occurring prior to the later interval of the cycle.

In the preferred embodiment, the write circuit provides output signals representative of the results of comparing input data signals from the utilization device and a data signal generated internally within the memory system. The circuit performs a comparison operation on the data signals received from the two different sources by first logically combining the data signals and conditionally modifying a prestored result in accordance with the comparison operation performed upon the data signals prior to the later interval of a memory cycle. During the later interval of the same cycle as the output driver circuits are enabled in accordance with the complement of the result stored thereby producing output signals representative of an exclusive OR operation.

The above and other objects of this invention are achieved in the preferred embodiment described hereinafter. Novel features which are believed to be characteristic of the invention both as to its organization and method of operation, together with further objects and advantages thereof will be better understood from the following description considered in connection with the accompanying drawings. It is to be expressly understood however, that these drawings are for the purpose of illustration and description only and are not intended as a definition of the limits of the present invention.

DESCRIPTION OF THE PREFERRED EMBODIMENT

Figure 1:
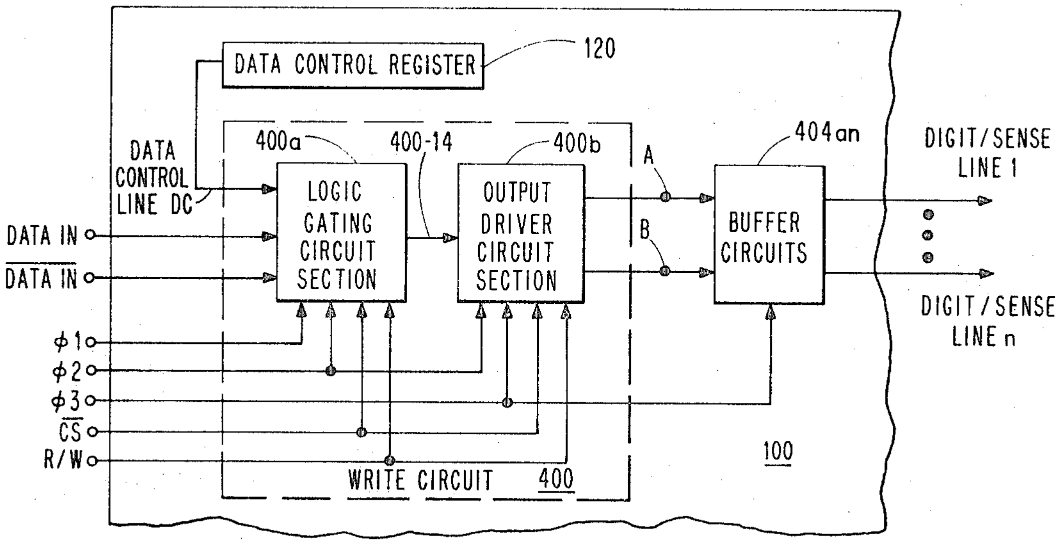
FIG. 1 illustrates in block form a portion of a memory system including a write circuit of the present invention.

FIG. 1 shows in block diagram form a portion of the memory system constructed on a single integrated circuit substrate or chip 100 including the write circuit 400 of the present invention and associated buffer memory circuits 404*a*H. Referring to FIG. 1, it is seen that the write circuit 400 includes a Logic Gating Circuit section 400*a* and an output Driver Circuit section 400*b* coupled as shown. The Logic Gating Circuit section 400*a* is operative to process binary data signals applied to the lines labeled DATA CONTROL, DATA IN, and $\overline{\text{DATA IN}}$ which are applied from different sources. In particular, the data signals applied to the line DATA CONTROL are generated from a portion of the memory system labeled as data control register 120. Normally, the data control register 120 includes a plurality of memory cells which store information to be combined with data read from the data written into the memory cells of the memory system. Since details of the memory system or the manner in which the memory system uses the information stored in the data control register 120 forms no part of the present invention neither will be described in further detail herein. For additional information relating to the memory system, and its organization, reference may be made to the co-pending patent application of Brian F. Croxon et al. entitled "A Random Access Memory System Utilizing an Inverting Cell Concept" bearing Ser. No. 215,976, filed on even date herewith and assigned to the same assignee named herein.

The data signals applied to the lines DATA IN and $\overline{\text{DATA IN}}$ are generated from a utilization device (not shown) located external to the memory chip 100. This device may take the form of a memory controller or similar apparatus well known in the art which is operative to process requests for access to the memory system from one or more processors. Additionally, the utilization device is operative to apply to clocking signals 01, 02 and 03 to the elements 400*a*, 400*b* and 404*a* and to apply a pair of control signals $\overline{\text{CS}}$ and R/W to elements 400a and 400b.

The timing signals 01, 02 and 03 which may be generated using conventional three phase clocking circuits, time the read and write operations performed within the chip. The controller uses a control signal $\overline{\text{CS}}$ to signal the memory chip, as well as the write circuit 400, when the chip is "selected" for access. When the control select signal CS is at a voltage level representative of a binary ONE (i.e. +3 volts), access is permitted and when the control select signal is at a voltage level representative of a binary ZERO (i.e. 0 volts), access is inhibited.

The control signal R/W is a low level command signal whose state defines the type of operation the write circuit 400 is to perform. For example, when the controller forces signal R/W to a voltage level representative of a binary ONE (i.e. three volts), the circuit 400 performs a write operation and when the controller forces signal R/W to a voltage level representative of a binary ZERO (i.e. zero volts), the circuit 400 performs a read operation.

The write circuit 400 is operative during a write operation to apply a pair of complementary output signals to terminals A and B for conditioning each one of *n* number of buffer circuits 404*a* to switch state and to apply signal levels representative of binary ONE and binary ZERO information to a corresponding one of the *n* digit/sense lines. Each of the buffer circuits 404*a* shown may be associated with a different one of a number of sectors or sections of a memory system and functions to isolate the write circuit 400 from that memory sector.

Figure 2:
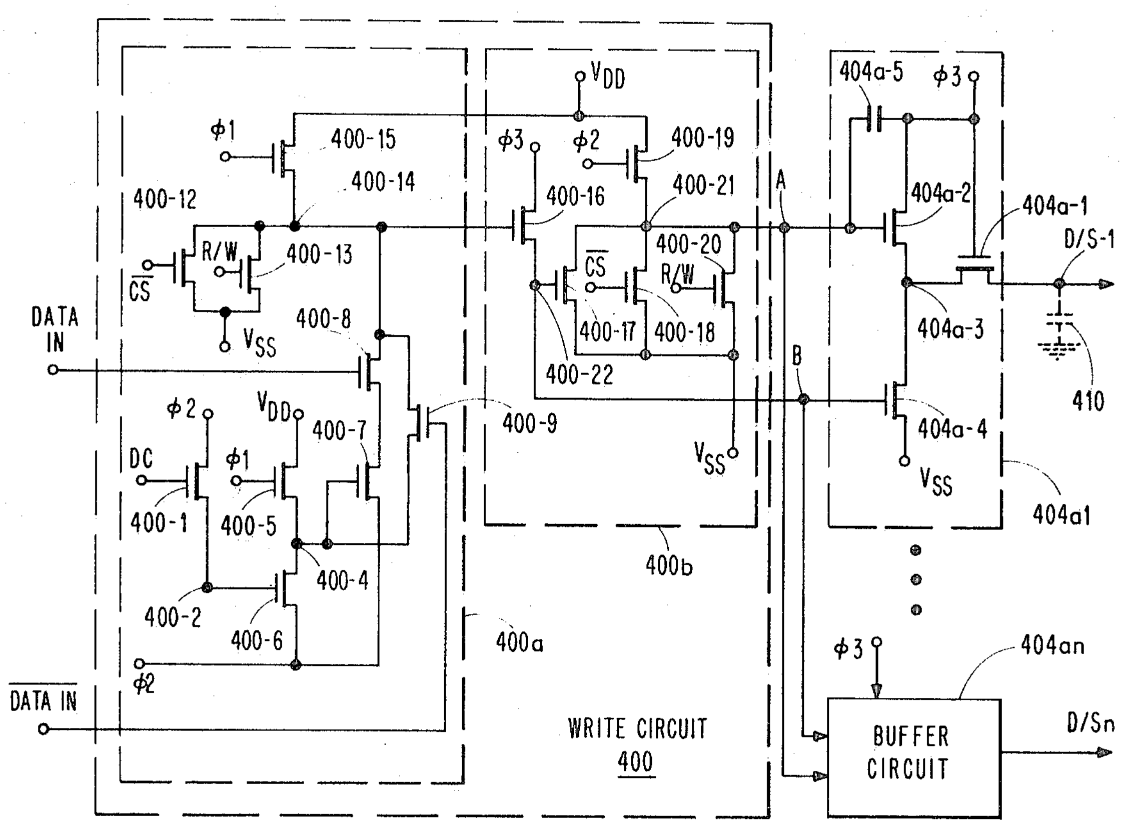
FIG. 2 illustrates in greater detail, certain ones of the blocks of FIG. 1; and, FIG. 3 illustrates a series of waveforms used to explain the operation of the present invention.

Considering the write circuit 400 and buffer circuit 404*a* in greater detail, it is seen from FIG. 2 that both circuits utilize active devices constructed of metal oxide semiconductor (MOS) field effect transistors or devices. As well known in the art, the MOS devices are fabricated on a single P or N type silicon substrate with each of the MOS devices having a gate or control region, a drain region and a source region herein referred to as gate (control), drain and source electrodes. For the purposes of the present invention, the source and drain electrodes can be regarded as being interchangeable.

In the embodiment shown, these devices are insulated gate P channel enhancement type field effect transistors. The enhancement type MOS device has been selected primarily for minimizing power in that the conductivity through the conduction path of the device is characteristically low and hence only a small leakage current flows between the source and drain regions when the gate and source electrodes are at the same voltage.

In the present invention, internal to the system, a voltage level representative of a binary ONE and a binary ZERO respectively corresponds to the drain supply Vdd of −15 volts and the source supply voltage Vss of +15 volts. Considering the operation of the P channel MOS transistor briefly, it will be noted that the majority carriers or holes flow from the source to drain electrodes (i.e. has a high conductivity conduction path) when the voltage applied to the gate electrode of the MOS device is negative relative to the voltage applied to the source electrode (i.e. a binary ONE). Conversely, when the voltage applied to the gate electrode of the P channel MOS device is negative relative to the voltage applied to the source electrode by an amount less than the threshold voltage of the device (i.e. voltage between gate and source electrodes) then the device is nonconductive as in the instance of a binary ZERO being applied thereto. As well known to those skilled in the art, the threshold voltage normally corresponds to a voltage between 1.5 to 2.5 volts. It will be appreciated that the above description is also indicative of the operation of N channel MOS devices using opposite polarity voltages.

The Write Circuit Logic Circuit section 400*a*, as shown, includes MOS devices 400-1, 400-8 and 400-9 each of which receive data signals at their respective gate electrodes from lines DATA CONTROL, DATA IN, and $\overline{\text{DATA IN}}$ respectively. The control signals CS and R/W are applied to the control electrodes of input MOS devices 400-12 and 400-13 which have their source electrodes connected in common to the source supply voltage, Vss. The drain electrodes of these devices connect in common to form a storage node 400-14. This node also connects to the drain electrodes of the MOS devices 400-8 and 400-9 in common with the gate electrode of MOS device 400-16 of the Output Driver Circuit section. As used herein, the term storage node refers to the parasitic or node capacitance existing between that common point and the substrate of an associated MOS device.

A MOS device 400-15, connected between the supply voltage Vdd and the node 400-14, responds to the clocking signal 01, applied to its gate electrode being forced to a voltage level representative of a binary ONE (i.e. 15 volts), by charging the node 400-14 negatively to the supply voltage Vdd through a path between the device's drain and source electrodes. The MOS devices 400-12 and 400-13 in response to low voltage levels representative of a binary ZERO (i.e. 0 volts) are arranged to discharge node 400-14 toward the supply voltage Vss.

The width to length ratio (i.e. gate to source dimension versus drain to source dimension) of MOS device 400-13 is adjusted to be larger than that of device 400-12 so as to decrease the time it takes the device to discharge node 400-14 when it is rendered conductive by signal R/W. For example, the width to length ratio for MOS device 400-13 may be 20/10 and the ratio for MOS device 400-12 may be greater than 10/10. While a ratio of 10/10 is suitable when the device is to be driven by high level signals, the ratio is adjusted to be greater than this value but less than the ratio for device 400-13 so that the device 400-12 can be driven by low level signals. Similarly, the ratios for MOS devices 400-8 and 400-9 are adjusted to provide the appropriate response times for the low level data input signals applied to their gate electrodes.

The MOS devices 400-8 and 400-9 connect in series with MOS devices 400-7 and 400-6 respectively, as shown, to provide alternate paths for conditionally discharging node 400-14 to the voltage established by clocking signal 02 in accordance with the state of the data signals applied to the gate electrodes. Additionally, the control electrode of MOS device 400-7 connects in common with the drain electrode of device 400-6 and the source electrode of device 400-5 to form a node 400-4. The device 400-5 which connects between the supply voltage Vdd and node 400-4 is operative when rendered conductive by clocking signal 01 being forced to a voltage level representative of a binary ONE, to charge node 400-4 negatively to supply voltage Vdd. During this time, device 400-6 is held nonconductive by a node 400-2.

The storage node 400-2 formed by connecting the source of electrode of MOS device 400-1 and the gate electrode of device 400-6 is charged and discharged in accordance with the voltage level applied to the DATA CONTROL line DC and to the voltage established by the clocking signal 02 which is applied to the drain electrode of the device 400-1. Normally during clocking signal 01, the voltage level applied to the line DATA CONTROL is a binary ONE and device 400-1 discharges the node 400-2 to a binary ZERO (i.e. the voltage established by clocking signal 02) which renders device 400-6 nonconductive.

During the interval defined by clocking signal 02, device 400-1 charges node 400-2 to a binary ONE as a consequence of clocking signal 02 being forced to a ONE. After the clocking signal 02 returns to a binary ZERO, device 400-1 conditionally discharges node 400-2 to a ZERO in accordance with the state of the DATA CONTROL line. Thus, it is seen that the device 400-1 samples the state of the DATA CONTROL line subsequent to the termination of clocking signal 02 and causes node 400-2 to store s signal which is the complement of the state of the signal sampled. Accordingly, the device 400-1 can be seen to perform the function of inverting the data signal applied to the DATA CONTROL line.

The device 400-6 can be seen to operate in a manner similar to that of device 400-1. In particular, during the interval defined by clocking signal 01, device 400-5 charges node 400-4 negatively. During the interval defined by clocking signal 02, node 400-4 remains charged negatively since both the node and source electrode of device 400-6 are at a binary ONE. However, upon clocking signal 02 being forced to a ZERO, the device 400-6 conditionally discharges node 400-4 in accordance with the state of node 400-2 so as to cause node 400-4 to store a signal which is the complement of the signal stored by node 400-2. Accordingly, MOS device 400-6 can also be seen to perform the function of inverting the signal applied to its gate electrode which corresponds to the complement of the signal applied to its gate electrode which corresponds to the complement of the signal applied to the DATA CONTROL line.

From the foregoing, it is seen that devices 400-1 and 400-6 are arranged to produce output signals corresponding to the complement and assertion of the signal applied to line DATA CONTROL following the termination of the clocking signal 02. The series connected MOS devices 400-6 and 400-9 together with series connected MOS devices 400-7 and 400-8 when clocking signal 02 goes to a ZERO, perform a comparison operation upon the low level data signals applied by the memory controller and the high level data signals derived from the memory chip 100 with the result being stored on node 400-14. That is, the states of the signals applied to line DATA IN and to line DATA CONTROL (i.e. stored by node 400-4) are compared. The states of the signals applied to the line $\overline{\text{DATA IN}}$ and the negation or complement of the signal applied to line DATA CONTROL (i.e. stored by node 400-2) are compared. In accordance with the results of the comparison, node 400-14 is conditionally discharged. For example, when the signal applied to the line DATA IN and the signal applied to line DATA CONTROL are both ONES at which time node 400-2 is a ZERO and node 400-4 is a ONE, node 400-14 remains charged negatively (i.e. at a ONE). However, when the signal applied to the line DATA IN is a ZERO and the signal applied to line DATA CONTROL is a ONE, node 400-14 is discharged through MOS devices 400-8 and 400-7 toward Vss (i.e. forced to a ZERO). A truth table for the logical operation performed by the Logic Gating Circuit section is as follows.

TABLE

| Line data in | Line data control | Storage node 400-14 |
|---|---|---|
| 0 | 0 | 1 |
| 0 | 1 | 0 |
| 1 | 0 | 0 |
| 1 | 1 | 1 |

Of course, it will be appreciated to those skilled in the art that where the data control register 120 is arranged to produce signals representative of the complement and assertion of the data signal applied to line DATA CONTROL line, the structural arrangement including devices 400-6, 400-7, 400-8 and 400-9 may be modified to conditionally discharge storage node 400-14 to a state representative of the result of the comparison operation performed upon the data signals applied to the circuit 400 by the utilization device and by the memory chip.

Continuing on with the description of Write circuit 400, it is seen from FIGS. 1 and 2 that the signal representation stored on node 400-14 is applied to the gate electrode of MOS device 400-16. The MOS device 400-16 which has clocking signal 03 connected to its drain electrode, has its source electrode connected in common with the gate electrode of a MOS device 400-17 to form a storage node 400-22. The device 400-16 is arranged to charge and discharge node 400-22 in accordance with the state of node 400-14 which in turn applies an output signal to the output terminal B.

The MOS devices 400-18 and 400-20 connect in parallel with device 400-17 to supply voltage Vss and to the source electrode of a MOS device 400-19 forming a storage node 400-21. As seen from FIG. 2, the structural arrangement of MOS devices 400-19, 400-18 and 400-20 is identical to that of MOS devices 400-15, 400-12 and 400-13. The MOS device 400-19 when rendered conductive by clocking signal 02 charges node 400-21 negatively. Conversely, the devices 400-17, 400-18 and 400-20 when rendered conductive discharge rapidly node 400-21 to the voltage Vss.

The node 400-21 connects to the output terminal A which in turn connects to a gate electrode of an upper MOS device of a pair of series connected devices corresponding to device **404*a*-2 within each of the buffer circuits 404a1 through 404*a*N. Additionally, the terminal A connects to one end of a boot-strapping capacitor within each buffer circuit corresponding to element 404*a*-5. The MOS device 400-19 is also operative to charge capacitor 404*a*-5 and render MOS device 404*a*-2 conductive when it is rendered conductive by clocking signal 02. By rendering device 404a-2** conductive during this interval, the response time of the buffer circuit is enhanced.

The other MOS device corresponding to device **404*a*-4 within each buffer circuit has its gate electrode connected to terminal B so as to be rendered conductive in accordance with the state of node 400-22. The source electrodes of devices 404*a*-2 and 404*a*-4 are connected to form a node 404-3. EAch of the devices 404*a*-2 and 404*a*-4 supply current to charge or discharge the line capacitance represented by capacitor 410 of a corresponding one of the digit/sense lines D/S 1** through D/S*n* in accordance with the state of the signals applied to terminals A and B.

The time during which capacitor 410 of the digit/-sense line is charged or discharged is controlled by a third MOS device included within each buffer circuit and which corresponds to device **404*a*-1. Since device 404*a*-1 connects in series between the digit/sense line and node 404*a*-3,** it isolates the buffer circuit from the line except when it is rendered conductive during the interval defined by clocking signal 03.

DESCRIPTION OF CIRCUIT OPERATION

Figure 3:
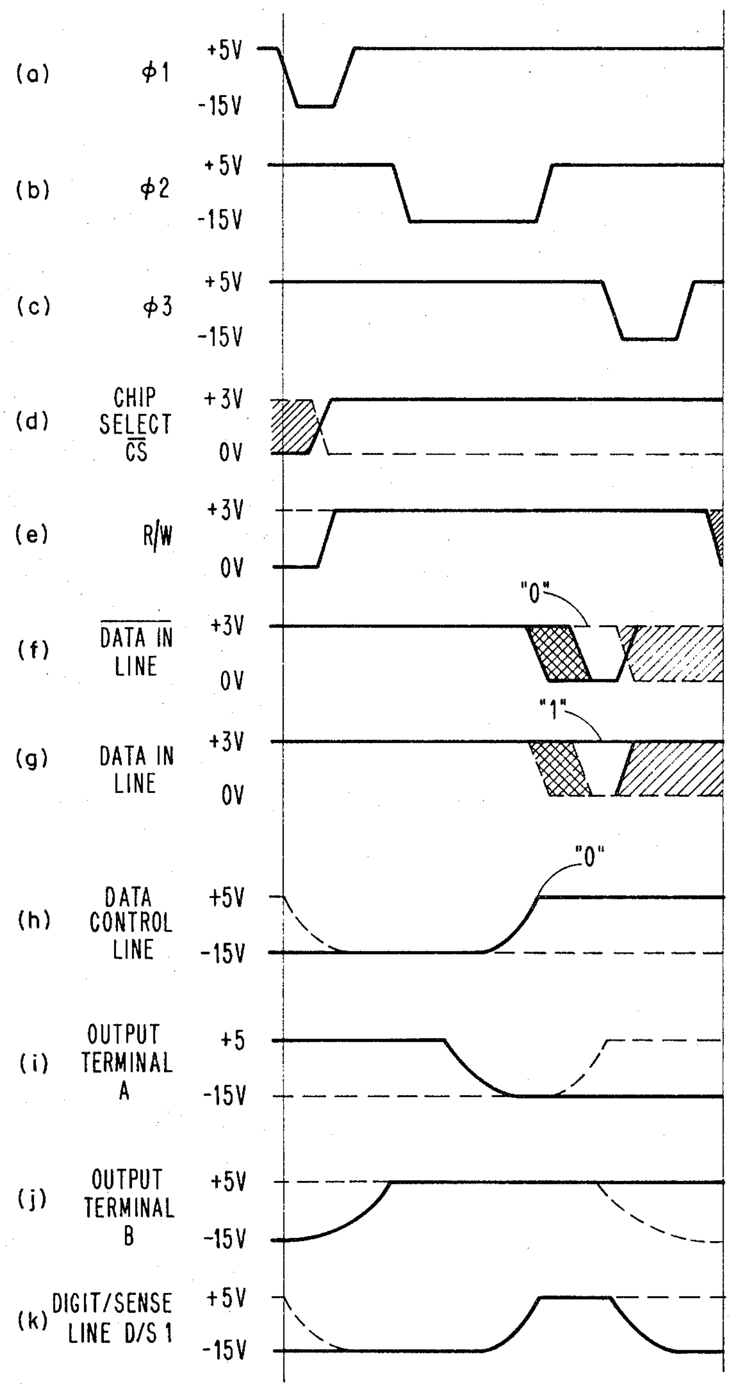

With reference to FIGS. 1, 2 and 3, the operation of the Write circuit 400 in performing a write operation will first be described. Initially, as seen from waveforms (*d*) and (*e*) of FIG. 3, the control signals CS and R/W are forced to ONE's (i.e. to +3 volts) by the memory controller signaling the Write circuit 400 that the chip has been "selected" for access and that it is to perform a write operation.

During the interval defined by clocking signal 01 (i.e. when clocking signal 01 is a binary ONE), the DATA CONTROL line when not already charged to a ONE is charged negatively which discharges node 400-2 to the voltage applied to the drain electrode as established by clocking signal 02. Additionally, each of the digit/sense lines D/S1 through D/Sn are charged negatively by circuits (not shown). The dotted portions of waveforms *h* and *k* illustrate the aforementioned charging of the DATA CONTROL line and line D/S1 where these lines are both initially binary ZEROS (i.e. at +5 volts). Also, during this interval, devices 400-5 and 400-15 rendered conductive by clocking signal 01 charge nodes 400-4 and 400-14 negatively (i.e. to binary ONES). Because node 400-2 discharges during the same interval, the device 400-6 is rendered non-conductive facilitating the charging of node 400-4.

During the interval defined by clocking signal 02 (i.e. when clocking signal 02 is a binary ONE, the DATA CONTROL line is conditionally discharged in accordance with the data stored within the data control register 120. It is assumed by way of example that the DATA CONTROL line discharges to a binary ZERO as illustrated by waveform *h* in FIG. 3. However, since this change of state does not occur immediately, the device 400-1 has ample time to charge node 400-2 negatively (i.e. to a binary ONE) subsequent to clocking signal 02 being forced to a binary ONE. The node 400-4 remains charged negatively when device 400-6 conducts since clocking signal 02 is a binary ONE during this time.

Additionally, device 400-19 is rendered conductive by clocking signal 02 and charges node 400-21, and each of the bootstrapping capacitors (i.e., capacitor **404*a*-5**) of the buffer circuits. Accordingly, terminal A is forced from a binary ZERO to a binary ONE as illustrated by the solid portion of waveforms *i* in FIG. 3. This in turn switches the upper MOS device of each buffer circuit (i.e. device **404*a*-2) into conduction. Since each of the output devices connected to the digit/sense lines 1 through n (i.e. device 404*a*-1) are nonconductive until clocking signal 03 is forced to a ONE, the states of all of the digit/sense lines remain unaffected. As mentioned previously, permitting the device 404*a*-2** to be conductive at this time enhances the response time of the buffer circuits.

It will be also noted from the solid portion of waveform *j* of FIG. 3 that at this time terminal B is at a voltage level representative of a binary ZERO. The terminal B is forced to a ZERO when the device 400-16 is rendered conductive by negatively charged node 400-14 to discharge node 400-22 to the positive voltage applied to its drain electrode by clocking signal 03 (i.e., when 03 is a binary ZERO).

Thus at the termination of the interval defined by clocking signal 02, the Write circuit 400 is conditioned to perform a write operation wherein the complement of the binary ONE stored on node 400-14 is written into a memory cell coupled to the digit/sense line associated therewith. Specifically, unless the signal stored on node 400-14 is modified by the logical operation performed upon the input data signals applied to devices 400-8, 400-7, 400-9 and 400-6 (e.g. the data signals are not equal), device 400-16 during an interval defined by clocking signal 03 is rendered conductive by negatively charged node 400-14. The device 400-16 therefore charges node 400-22 negatively inturn forcing terminal B to a binary ONE as illustrated by the dotted portion of waveform *j*. At the same time, node 400-22 by being charged negatively (i.e. to a binary ONE) renders device 400-17 conductive in turn rapidly discharging node 400-21 and each of the bootstrapping capacitors to a binary ZERO (i.e. to a voltage Vss). This forces terminal A to a binary ZERO as illustrated by the dotted portion of waveform *i*.

The states of terminals A and B switch the upper device of each buffer circuit (i.e. device 404*a*-2) from a conductive state to a nonconductive state and switch the lower device of each buffer circuit (i.e. device 404*a*-4) from a nonconductive state to a conductive state respectively. Simultaneously therewith, the output device of each buffer circuit is rendered conductive by clocking signal 03, causing each of the digit/sense lines to be discharged to a binary ZERO (i.e. to the voltage Vss).

However, in this example, it is assumed that the DATA CONTROL line is a binary ZERO and the DATA IN line is a binary ONE (i.e. +3 volts) causing the $\overline{\text{DATA IN}}$ line to a binary ZERO (i.e. 0 volts) as illustrated by the solid lines in waveforms *h*, *g* and *f* of FIG. 3. Accordingly, device 400-8 is held nonconductive by the binary ONE applied to its gate electrode while device 400-9 switches into conduction when its electrode is forced into a binary ZERO. At the same time, node 400-2 which is charged negatively (i.e. to a binary ONE) renders device 400-6 conductive thereby establishing a path for discharging node 400-14 to the voltage Vss (i.e. to a binary ZERO). When the clocking signal 03 is forced from a binary ZERO to a binary ONE, node 400-14 will have been discharged to a binary ZERO. The crosshatched portions of waveforms *f* and *g* indicate the time for which the data signals applied to the lines DATA IN and $\overline{\text{DATA IN}}$ remain unchanged to allow sufficient time for discharging node 400-14 to a ZERO prior to clocking signal 03 being forced to a ONE.

When the clocking signal 03 is forced to a ONE, storage node 400-14 previously discharged, holds device 400-16 nonconductive which maintains node 400-22 and terminal B at a binary ZERO as illustrated by the continuance of the solid line in waveform *j* in FIG. 3. The node 400-22 maintains device 400-17 nonconductive which holds node 400-21 and the bootstrapping capacitor of each buffer circuit together with terminal A at a binary ONE. This is illustrated by the continuance of the solid line of waveform *i* in FIG. 3. Accordingly, when each of the output devices (i.e. device 404a-1) of the buffer circuits are switched on by clocking signal 03, the upper device of each buffer circuit previously conductive supplies current for charging the capacitance of each digit/sense line to a binary ONE as illustrated by the solid line in waveform *k* of FIG. 3. Of course, the aforementioned charging of the digit/sense lines takes place only when these lines are discharged during the read interval of the memory cycle as defined by clocking signal 02. In this example, as illustrated by the solid portion of waveform k, it is assumed that the line D/S1 was caused to be discharged from a binary ONE to a binary ZERO by one of the memory cells connected thereto during the read interval corresponding to the interval, clocking signal 02 is a binary ONE.

It can be seen from the foregoing that the Write circuit 400 in accordance with the results of a comparison operation modifies the binary ONE state of node 400-14 by switching the state to a binary ZERO when the data signals are not in the same state. In accordance with the complement of the signal stored on node 400-14, the Write circuit 400 applies appropriate output signals to each of the buffer circuits via terminals A and B for charging the capacitances of their respective digit/sense lines when the node 400-14 stores a signal indicative of the fact that the data signals were not in the same state.

It will be noted that where the complement or inversion of the data signal sampled from line DATA CONTROL represents the state of the data signal read out from the data control register 120 that the logical operation performed upon the data signals applied to the logic Gating Circuit section corresponds to an exclusive OR operation. Accordingly, when the complement of the result stored is used to condition the output Driver Circuit section, the Write circuit 400 is seen to charge and discharge the digit/sense capacitances in accordance with the results of a comparison operation.

From FIG. 3, it can be seen that during a read modify write cycle of operation, the Write circuit 400 operates as just described with the exception that the data signals read out during the read interval defined by clocking signal 02 are to be applied to the lines DATA IN and $\overline{\text{DATA IN}}$ by the controller. However, those signals applied normally can be made subject to modification by the controller as a result of a checking operation with such modification being made subsequent to the termination of clocking signal 02 and prior to clocking signal 03. Of course, it will be noted that during a read modify write cycle of operation, by simply delaying the application of the data signals applied to the lines DATA IN and $\overline{\text{DATA IN}}$ in addition to clocking signal 03, it is possible to increase the amount of time allowed for modifying the signals read out during the same cycle before they are applied to the same lines.

In some instances during a write operation, the controller may also want to prevent the write operation from taking place during a cycle once the cycle has been initiated. In such instances, the controller is operative to force the R/W control signal from a ONE to a ZERO signaling the Write circuit 400 of the change in operation. This renders devices 400-13 and 400-20 conductive discharging nodes 400-14 and 400-21 together with the bootstrapping capacitor of the buffer circuits to a binary ZERO. Accordingly, when clocking signal 03 is forced to a ONE, terminals A and B are both at binary ZEROS rendering both devices of the buffer circuits (i.e. devices 404*a*-2 and 404*a*-4) nonconductive. Since both devices 400-13 and 400-20 have fast response times, as previously mentioned, a considerable portion of each operative cycle is provided for such changes in operations.

When the above change in state of control signal R/W occurs at the beginning of a cycle, the Write circuit 400 is arranged to operate in a read mode and its operation is the same as just described (i.e. both nodes 400-14 and 400-20 are discharged to binary ZEROS). Hence, the write circuit remains inactive during a read cycle of operation so that it does not affect the operation of other circuits on the chip. Similarly, the operation of the Write circuit 400 is the same (i.e. as for a read cycle of operation) when the control signal CS is forced to a binary ZERO with the exception that nodes 400-14 and 400-20 are discharged through devices 400-12 and 400-18 respectively.

In summary, it is seen that the invention provides a write circuit which facilitates the processing of requests made by a controller associated therewith by being able to respond directly to low level data signals and perform logical operations upon these signals. Further, in accordance with control signals from the controller, the write circuit is able to modify its operation so as to be able to respond to change in request as well as being able to perform a read modify write operation in response to low level data signals. The circuit accomplishes this with requiring no more than three phase input clocking signals.

Also, the Write circuit of the present invention is able to process low level input data signals with the gating circuits of the present invention by adjusting the width to length ratios of the input MOS devices. Additionally, the circuit is able to operate to charge and discharge rapidly high capacitance loads.

It will be appreciated by those skilled in the art that many changes can be made to the embodiment illustrated without departing from the scope of the present invention. For example, the invention is not limited to the exact logical configuration shown. Further, although insulated gate MOS P channel devices have been illustrated and described, other switching devices can also be used. Also, the circuit can be arranged to respond to other combinations of low level control and data signals to high level input signals only, or to low level signals only.

It will also be appreciated that the circuit of the present invention can be used in other applications wherein it is desirable to process information signals from different sources at different intervals of time during a cycle of operation.

While in accordance with the provisions and statutes, there has been illustrated and described the best form of the invention known, certain changes may be made in the technique and system described without departing from the spirit of the invention as set forth in the appended claims and that in some cases, certain features of the invention may be used to advantage without a corresponding use of other features.

Having described the invention, what is claimed as new and novel is:

1. A MOS integrated write circuit apparatus comprising:

logic gating means including:

a storage node;

transistor circuit means being coupled to said storage node and to a first reference voltage, said transistor circuit means including means for receiving a first clocking signal, said first clocking signal conditioning said transistor circuit means to charge said storage node to said first reference voltage corresponding to a state representative of an anticipated predetermined result;

transistor logic means for receiving a second clocking signal and at least first and second binary information signals, said transistor logic means being operative at the termination of said second clocking signal to logically combine said first and second binary signals and to change the state of said storage node in accordance with the results of logically combining said binary signals; and, transistor driver means including:

transistor input means connected to said storage node for receiving said stored signal; and, transistor output means connected to said transistor input means and to first and second output terminals, said transistor output means including first and second output nodes coupled to said first and second output terminals, said transistor input means being connected to receive a third clocking signal, said transistor input means being responsive to said third clocking signal and to said state of said storage node to condition said transistor output means to charge and discharge selectively said first and second output nodes to different states in accordance with the state of said storage node so as to produce complementary output signals at said first and second output terminals representative of the result of combining said binary information signals.

2. The write circuit apparatus of claim 1 wherein said transistor logic means is connected to compare the states of said binary information signals and switch the state of said storage node, said transistor output means being conditioned by a change in state of said storage node to apply said complementary output signals corresponding to the complement of the result of comparing said states of said binary signals.

3. The write circuit apparatus of claim 1 wherein said transistor circuit means includes:

a MOS device having a control and first and second output electrodes, said control electrode being connected to receive said first clocking signal, said first electrode being connected to a first reference voltage and said second electrode being connected to said storage node; and wherein said transistor logic means further includes:

first and second pairs of series connected first and second MOS devices, each of said MOS devices having control, first and second output electrodes, said control electrodes of said first MOS device of said first and second pairs respectively being connected to receive the assertion and the complement of a first one of said binary information signals, and said control electrodes of said second MOS device of said first and second pairs respectively being connected to receive the assertion and complement of a second one of said binary information signals, said second electrodes of said first MOS devices being connected in common to said first electrode of said MOS device of said transistor circuit means, said first electrodes of said second MOS devices being connected to a second reference voltage; and wherein said storage node includes;

capacitor means being connected to said output electrodes of said first MOS devices, said capacitor means being charged to said first reference voltage representative of said anticipated predetermined result by said MOS device of said transistor circuit means in response to said first clocking signal and said capacitor means being conditionally discharged to said second reference voltage during an interval following the termination of said second clocking signal through said first and second pairs of said MOS devices in accordance with said result of logically combining the states of said assertion and complement of said second binary information signal sampled in response to said second clocking signal.

4. The write circuit apparatus of claim 1 wherein said storage node includes capacitor means connected to said transistor circuit means and to said transistor driver means, said capacitor means being connected to store temporarily said state representative of said result.

5. The write circuit apparatus of claim 4 wherein said transistor driver means includes:

first MOS transistor input switching means having control, first and second output electrodes, said control electrode being connected to said capacitor means of said storage node, said first electrode being connected to said second output node and said second electrode being connected to receive said third clocking signal;

second MOS transistor switching means having control, first and second output electrodes, said control electrode being connected to receive said second clocking signal, said second electrode being connected to a first reference voltage and said first electrode being connected to said first output node;

said first output node including first capacitor means connected to said first output terminal and being charged by said second MOS transistor switching means to said first reference voltage in response to said second clocking signal;

third MOS transistor switching means having control, first and second output electrodes, said control electrode being connected to said first electrode of said first transistor switching means, said first electrode being connected to said second reference voltage and said second electrode being connected to a first electrode of said second transistor switching means; and said second output node including second capacitor means connected to said control electrode of said third MOS transistor switching means and being connected to be discharged by said second MOS transistor means to said second reference voltage in response to said first clocking signal;

said first transistor switching means in response to said third clocking signal being conditioned by said stored signal on said storage node to switch the state of said first and second output terminals by selectively discharging said first capacitor means to said first reference voltage through said third transistor switching means and selectively charging said second capacitor means to said first reference voltage by said first transistor in accordance with the state of said storage node.

6. The write circuit apparatus of claim 5 wherein said capacitor means of said storage node includes the intrinsic capacitance of said control electrode of said first MOS transistor switching means and said first capacitor means of said first output node includes the intrinsic capacitance of said control electrode of said third MOS transistor switching means.

7. The write circuit apparatus of claim 5 wherein said apparatus further includes buffer circuit means connected to said transistor circuit driver means and to an input/output bus of a storage unit, said buffer circuit means including:

first MOS transistor means having control, first and second output electrodes, said control electrode being connected to said first output terminal and said second electrode being connected to receive said third clocking signal;

capacitor means connected between said control and first electrodes of said first MOS transistor means;

second MOS transistor means including control, first and second output electrodes, said second electrode being connected to said first electrode of said first transistor means, said first electrode being connected to said second reference voltage and said control electrode being connected to said second output terminal; and, third MOS transistor means including control, first and second output electrodes, said first electrode being connected to said first and second electrodes of said first and second MOS transistor means respectively, said control electrode being connected to receive said third clocking signal, said capacitor means being charged to said first reference voltage together with said first capacitor means of said first output node by said second MOS transistor switching means of said transistor output means in response to said second clocking signal switching said first MOS transistor means into conduction and, said first and third MOS transistor switching means being conditioned by one set of states of said complementary output signals from said first and second output nodes to enable the charging said input/output bus to said first reference voltage in response to said third clocking signal and said second and third MOS transistor switching means being conditioned by another set of states of said complementary output signals from said output nodes to enable the discharging said input/output bus to said second reference voltage whereby the state of said input/output bus at the termination of said third clocking signal represents the binary information to be stored by said storage unit.

8. The write circuit apparatus of claim 7 wherein said first capacitor means of said first output node includes the intrinsic capacitance of said control electrode of said first MOS transistor means.

9. Write circuit apparatus for use in an addressable semiconductor memory store for writing binary ONE and binary ZERO information into an addressed memory cell of said store, said write circuit apparatus comprising:

logic gating means including:

transistor circuit means for receiving a first clocking signal;

storage node capacitor means connected to said transistor means and being conditioned by said transistor circuit means during an occurrence of said first clocking signal to store a signal representative of a predetermined result;

transistor logic means connected to said capacitor means, said transistor logic means including means for receiving a second clocking signal and transistor gating means for receiving at least first and second binary input signals, said transistor gating means being operative to logically combine said first and second signals in response to the termination of said second clocking signal and said transistor gating means being connected to change the state of said storage node capacitor means in accordance with the result of logically combining said signals; and, transistor driver means including:

transistor input means connected to said capacitor means for receiving said stored signal; and, transistor output means connected to said transistor input means and said output means including transistor switching means coupled to a first and a second output terminal, said transistor input means being connected to receive a third clocking signal and being operative in response to said third clocking signal to condition said transistor switching means to be switched so as to apply complementary output signals to said first and second output terminals representative of binary information in accordance with the state of said stored signal.

10. The write circuit apparatus of claim 9 further including at least one buffer circuit means comprising:

first MOS transistor means having control, first and second output electrodes, said control electrode being connected to said first output terminal and said second electrode being connected to receive said third clocking signal;

capacitor means connected between said control and first electrodes of said first MOS transistor means;

second MOS transistor means including control, first and second output electrodes, said second electrode being connected to said first electrode of said first transistor means, said first electrode being connected to said second reference voltage and said control electrode being connected to said second output terminal; and, third MOS transistor means including control, first and second output electrodes, said first electrode being connected to said first and second electrodes of said first and second MOS transistor means respectively, said control electrode being connected to receive said third clocking signal, said capacitor means being charged to said first reference voltage together with said first capacitor means by said second MOS transistor switching means of said transistor output means in response to said second clocking signal switching said first MOS transistor means into conduction and, said first and third MOS transistor switching means being conditioned by one set of states of said complementary output signals to enable the charging said input/output bus to said first reference voltage in response to said third clocking signal and said said second and third MOS transistor switching means being conditioned by another set of states of said complementary output signals to enable the discharging said input/output bus to said second reference voltage whereby the state of said input/output bus at the termination of said third clocking signal represents the binary information to be stored in said addressed memory cell.

11. The write circuit apparatus of claim 1 further including:

a plurality of control transistor switching means, a first one of said control transistor means being connected to said storage node and to said second reference voltage,; and a second one of said control transistor switching means connected to a predetermined one of said output nodes of said transistor output means and to said second reference voltage;

each of said first and second ones of said control transistor switching means being connected to receive a first bilevel mode control signal, said first and second control transistor means being responsive to one level of said control signal to discharge said storage node and said predetermined one of output nodes respectively to said second reference voltage inhibiting the operation of said transistor logic means and said transistor output means.

12. The write circuit apparatus of claim 11 wherein a third and a fourth one of said plurality of said control transistor means are connected in parallel with said first and said second ones of said control transistor switching means respectively, said third and fourth ones of said control transistor means each being connected to receive a second bilevel select control signal, said third and fourth ones of said control transistor means being responsive to one level said second control signal to discharge said storage node and output node respectively inhibiting said operation of said transistor logic means and said transistor output means.

13. The write circuit of claim 11 wherein each of said control transistor switching means includes:

at least one MOS transistor having control, first and second output electrodes, said control electrode being connected to receive said bilevel control signal and said first electrode being connected to said second reference voltage; said second output electrode of MOS transistor of said first one of said plurality of control transistor switching means being connected to said storage node;

said second output electrode of said MOS transistor of said second one of said plurality of control transistor switching means being connected to said predetermined one of said output nodes, and each of said MOS transistors being responsive to said one level of said bilevel signal to switch into conduction and provide a conduction path between said first and second output electrodes for discharging said storage node and said one predetermined of said output nodes to said second reference voltage.

14. The write circuit of claim 13 wherein each of said MOS transistors has a predetermined width to length ratio, said predetermined width to length ratio being selected to enable said transistors to discharge said storage node and said predetermined one of said output nodes to said second reference voltage within a predetermined time interval after said bilevel control signal switches to said one level.

15. The write circuit of claim 13 wherein said bilevel control signal is a low level signal and each of said MOS transistors has a predetermined width to length ratio, said predetermined width to length ratio being selected to enable said transistors to discharge said storage node and said predetermined one of said output nodes to said second reference voltage within a predetermined time interval after said bilevel control signal switches to said one level.

16. The write circuit apparatus of claim 9 wherein said transistor logic means includes:

first and second pairs of series connected first and second MOS devices, each of said MOS devices having control, first and second output electrodes, said control electrodes of said first MOS device of said first and second pairs respectively being connected to receive the assertion and the complement of a first one of said binary information signals, said control electrodes of said second MOS devices of said first and second pairs respectively being connected to receive the assertion and complement of a second one of said binary information signals, said second electrodes of said first MOS devices being connected in common to said storage node capacitor means and said first and second MOS devices of said first and second pairs being conditioned by said binary information signals to provide alternate conductive paths to discharge conditionally said capacitor means to said second reference voltage at the termination of said second clocking signal whereby said capacitor means stores a signal representing said result of logically combining said binary information signals.

17. The write circuit apparatus of claim 16 wherein each of said second MOS devices has an intrinsic control electrode capacitance for temporarily storing signals and wherein said transistor logic means further includes input means comprising:

a first clocked MOS device having control, first and second output electrodes, said control electrode being connected to receive the assertion of said second one of said binary information signals, said second output electrode being connected to receive said second clocking signal;

a second clocked MOS device having control, first and second output electrodes, said control electrode being connected to receive said first clocking signal, said first electrode being connected to said control electrode and said first electrode of said second and first MOS device respectively of said first and second pairs; and, circuit means for applying said second clocking signal to said first electrodes of said second MOS device of said first and second pairs, said second clocked MOS device being conditioned by said first clocking signal to provide a conductive path between said first and second output electrodes to charge said intrinsic capacitance of said second MOS device of said first pair to said first reference voltage, said first clocked MOS device of said input means being conditioned by said second clocking signal to provide a conductive path between said first and second electrodes to charge said intrinsic capacitance of said second MOS device of said first pair to said first reference voltage and said first clocked MOS device at the termination of said second clocking signal being conditioned by said second binary signal to provide a conductive path between said first and second electrodes to discharge selectively said intrinsic capacitance of said second MOS device of said second pair to said second reference voltage in accordance with the state of said second binary information signal, said second MOS device of said second pair being conditioned by the state of said intrinsic capacitance to provide a conductive path between said first and second output electrodes to discharge said intrinsic capacitance of said second MOS device of said first pair thereby producing said assertion and complement of said second binary information signal.

18. The write circuit apparatus of claim 17 wherein said input circuit means is connected to receive said second binary information signal from said semiconductor memory store and wherein said first MOS devices of said first and second pairs are connected to receive said assertion and complement of said first binary information signal.

19. The write circuit apparatus of claim 17 wherein said assertion and complement of said first information signal are low level signals and wherein the gain of each of said first MOS devices of said first and second pairs is selected so as to respond to said signals within a predetermined time period.

20. The write circuit apparatus of claim 17 wherein each of said MOS devices are P channel enhancement type transistors.

21. The write circuit apparatus of claim 17 wherein said first and second pairs of MOS devices selectively discharge said storage node capacitor means to said second reference voltage when said first and second binary information signals have the same states thereby producing a stored signal on said capacitor means representative of the result of an exclusive OR operation performed on said binary information signals.

22. The write circuit apparatus of claim 21 wherein said second binary signal represents the complement of the binary information signal to be logically combined and said first and second pairs of MOS devices selectively discharge said storage node capacitor means to said second reference voltage when said first and second binary information signals have the same states thereby producing a stored signal on said storage node capacitor means representative of the result of the complement of said exclusive OR operation.

23. An apparatus being operative during a cycle of operation to generate output information signals representative of binary ONE and binary ZERO information in response to input data signals, said apparatus comprising:

input logic gating circuit means including:

transistor means for receiving first and second bilevel data signals and first and second clocking signals, and capacitive node storage means connected to said transistor means; and, transistor driver circuit means connected to said storage node means and including means for receiving a third clocking signal, said transistor means including transistor means connected to a first reference voltage and to said node storage means, said transistor means being conditioned by said first clocking signal to charge said capacitive node storage means to a first reference voltage representative of a predetermined result during a first interval of said cycle, said transistor means including transistor logic switching means connected to said node storage means and to a second reference voltage, said switching means being conditioned by said second clocking signal to sample the state of one of said input data signals and at the termination of said second clocking signal logically combine said sampled signal with said other data signal so as to provide a conductive path for discharging selectively said node storage means to said second reference voltage changing said predetermined result and said transistor driver circuit including transistor switching means being conditioned by said third clocking signal during a third interval of said cycle to transfer an information signal to an output terminal representative of said result stored by said capacitive storage means.

* * * * *

UNITED STATES PATENT OFFICE

CERTIFICATE OF CORRECTION

PATENT NO. : 3,747,076

DATED : July 17, 1973

INVENTOR(S) : William L. Martino, Jr.

It is certified that error appears in the above-identified patent and that said Letters Patent are hereby corrected as shown below:

Column 3, line 22, delete "404aH" and insert --404an--.

Column 3, line 55, delete "01, 02 and 03" and insert --Ø1, Ø2 and Ø3--.

Column 3, line 58, delete "01, 02 and 03" and insert --Ø1, Ø2 and Ø3--.

Column 3, line 64, delete "CS" and insert --$\overline{CS}$--.

Column 5, line 20, delete "01" and insert --Ø1--.

Column 5, line 49, delete "02" and insert --Ø2--.

Column 5, line 56, delete "01" and insert --Ø1--.

Column 5, line 66, delete "02" and insert --Ø2--.

Column 6, line 1, delete "01" and insert --Ø1--.

Column 6, line 4, delete "02" and insert --Ø2--.

Column 6, line 6, delete "02" and insert --Ø2--.

Column 6, line 8, delete "02" and insert --Ø2--.

Column 6, line 9, delete "02" and insert --Ø2--.

Column 6, line 14, delete "02" and insert --Ø2--.

Column 6, line 22, delete "01" and insert --Ø1--.

Column 6, line 24, delete "02" and insert --Ø2--.

UNITED STATES PATENT OFFICE
CERTIFICATE OF CORRECTION

Patent No. 3,747,076 Dated July 17, 1973

Inventor(s) William L. Martino, Jr.

It is certified that error appears in the above-identified patent and that said Letters Patent are hereby corrected as shown below:

Column 15, line 38, before "capacitor", insert --input--.

Column 15, line 52, before "capacitor", insert --input--.

Column 15, line 54, delete "together with said first capacitor means".

Column 15, line 54, delete "sec-".

Column 15, line 55, delete "ond MOS transistor switching means of said".

Column 15, line 55, before "tran-", insert --switching--.

Column 15, line 63, after "and" delete --said--.

Signed and sealed this 27th day of November 1973.

(SEAL)
Attest:

EDWARD M.FLETCHER,JR.
Attesting Officer

RENE D. TEGTMEYER
Acting Commissioner of Patents